Figure 6:
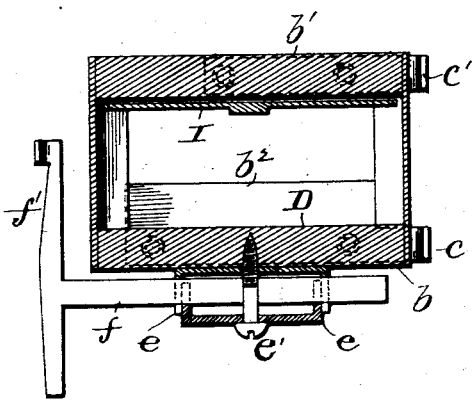

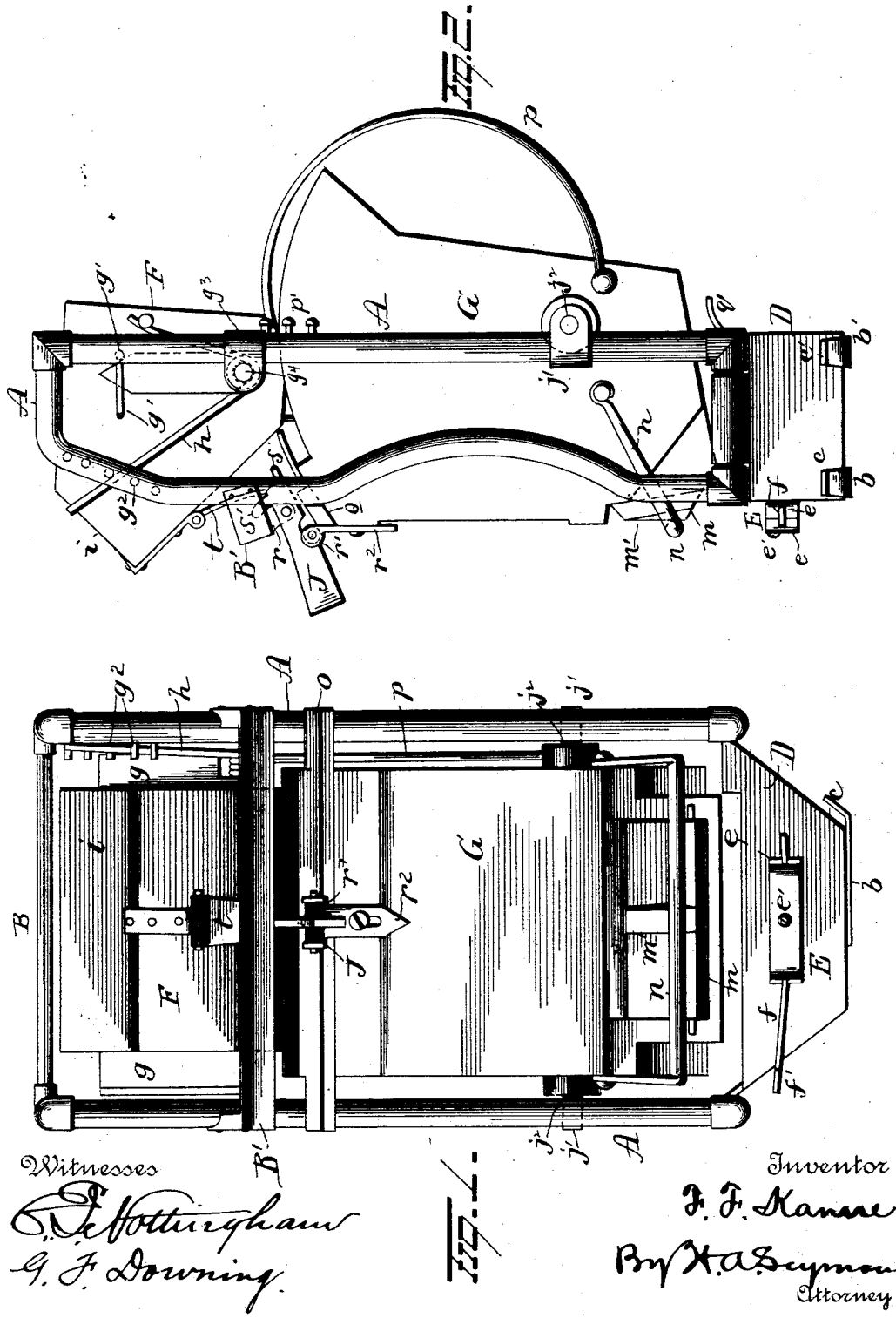

(Model.) 3 Sheets—Sheet 2.
F. F. KANNE.
GRAIN METER.
No. 525,764. Patented Sept. 11, 1894.
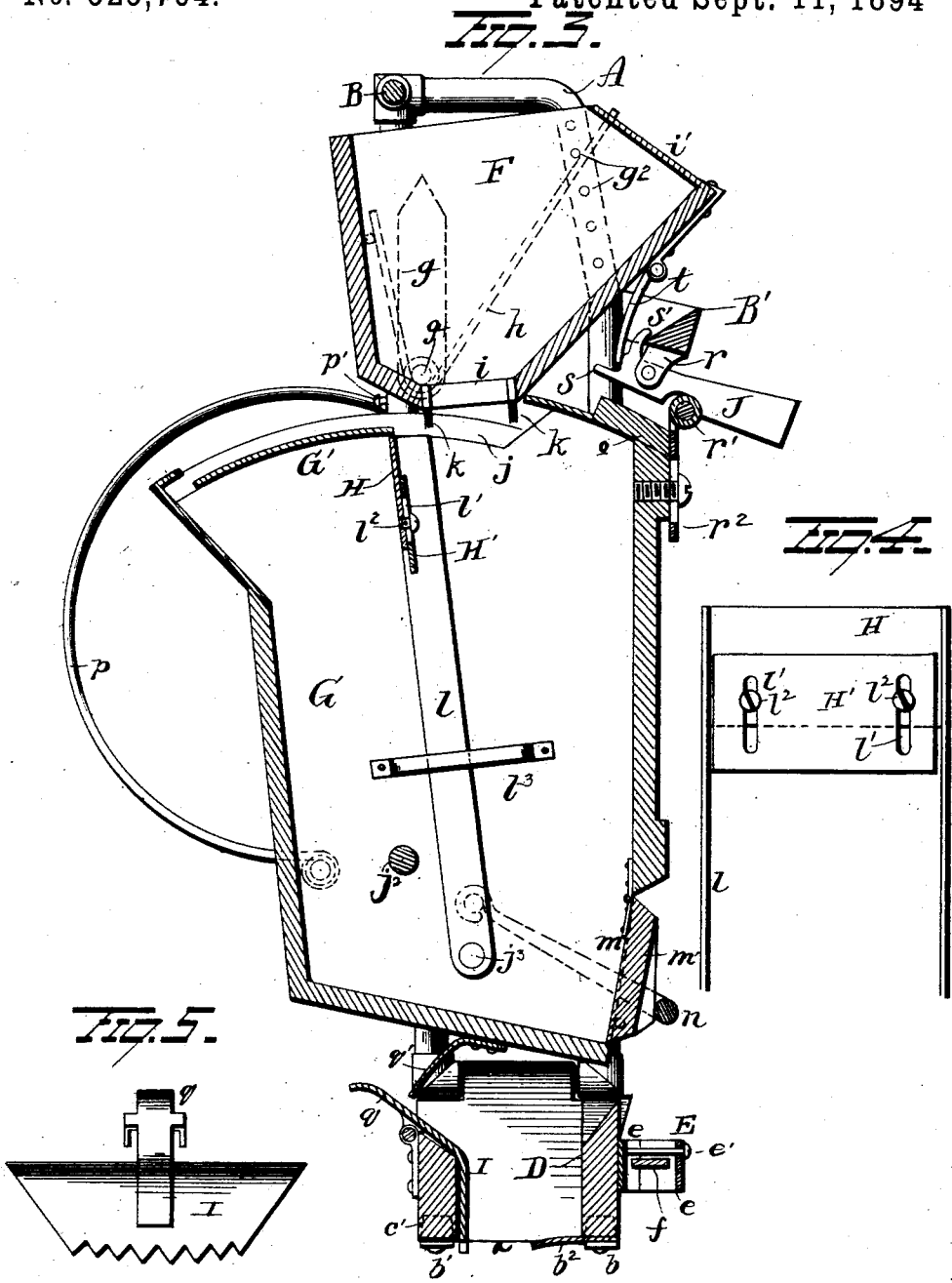
Witnesses
E. Nottingham
G. F. Downing.
Inventor
F. F. Kanne
By H. A. Seymour
Attorney (Model.)

3 Sheets—Sheet 3.

F. F. KANNE.
GRAIN METER.

No. 525,764. Patented Sept. 11, 1894.

Witnesses
G. F. Downing
S. W. Foster

Inventor
F. F. Kanne
By H. A. Seymour
Attorney

UNITED STATES PATENT OFFICE.

FREDERICK FRANK KANNE, OF WATERVILLE, MINNESOTA.

GRAIN-METER.

SPECIFICATION forming part of Letters Patent No. 525,764, dated September 11, 1894.

Application filed June 25, 1892. Serial No. 437,999. (Model.)

*To all whom it may concern:*

Be it known that I, FREDERICK FRANK KANNE, a citizen of the United States, residing at Waterville, in the county of Le Sueur and State of Minnesota, have invented certain new and useful Improvements in Grain-Meters; and I do hereby declare the following to be a full, clear, and exact description of the invention, such as will enable others skilled in the art to which it appertains to make and use the same.

My invention relates to an improvement in meters for measuring dry materials, such as grain,—the object of the invention being to produce a grain meter which shall be automatic in its operation to measure (not weigh) grain or other dry material.

A further object is to provide a grain meter comprising two pivotally supported or tipping receptacles, with a trip mechanism so constructed and arranged that it will be automatically operated to release the main part or receptacle and release itself from the action of the upper one so that it can fasten the lower or main receptacle again before the upper part or receptacle is again in position to engage said trip.

A further object is to provide a grain meter comprising an upper hopper or receptacle and a lower or main receptacle, with a trip mechanism so constructed and arranged that the upper receptacle or hopper will be permitted to hold the grain discharged therein during the time the lower or main receptacle is discharging grain into a sack or other device and so that when the main receptacle shall have emptied itself and assumed its normal position said trip will be in position to receive and lock it.

A further object is to provide a grain meter with simple and efficient devices whereby the difference in weight in different kinds of grain can be readily compensated for.

A further object is to provide a grain meter comprising a pivotally supported main receptacle, with means whereby said receptacle will be prevented from closing and assuming its normal position to receive more grain, until the grain already therein shall have been completely discharged.

A further object is to construct a grain meter comprising an upper hopper or receptacle and a lower or main receptacle, that the upper hopper or receptacle will receive and retain grain therein while the main or lower receptacle is discharging, and so that when the lower or main receptacle returns to its normal position to receive more grain, the grain in the upper hopper or receptacle will be made to enter the lower or main receptacle by the action of the latter.

A further object is to produce a device for measuring grain which shall be operated automatically by the action of the grain passing through it.

A further object is to produce a grain meter which shall be simple in construction, sure of operation and effectual in the performance of its functions.

With these objects in view the invention consists in certain novel features of construction and combinations and arrangements of parts as hereinafter set forth and pointed out in the claims.

In the accompanying drawings: Figure 1 is a front elevation of my improved meter. Fig. 2 is a side view. Fig. 3 is a vertical sectional view. Figs. 4 and 5 are detail views. Fig. 6 is a horizontal section through spout D taken just above the plane of arm $f$.

A, A represent the uprights comprising the frame of the machine, which will preferably be made of sections of pipe, being connected together at their upper ends by means of a cross bar B, and at a point below the upper ends of said uprights they are connected together by means of a cross bar B'. To the lower end of the frame a spout or outlet D is secured and made with a contracted opening $a$. To one side of the opening $a$, plates $b\ b^2$ are secured, the plate $b^2$ being adapted to project at its edge over said opening, and one end of said plate $b$ being adapted to project beyond the spout D where it is turned upwardly to produce a hook $c$. At the other side of the opening $a$, another plate $b'$, is secured and projects at one end beyond the spout D, where it is bent upwardly to produce a hook $c'$. Secured to one face of the spout D is a set bracket E, comprising two plates $e, e$, held together by means of an adjusting screw $e'$. A T-shaped arm $f$ is held by this bracket, one of the laterally projecting portions of said arm being made with a hook $f'$, to which one portion of a bag or other receptacle is to be attached, said bag or receptacle being also adapted to be supported by the hooks $c$, $c'$,—thus the hooks $c$, $c'$, constitute a simple and efficient bag holder.

Pivotally supported between the uprights A, A, in proximity to the upper ends thereof, is a hopper or receptacle F, having shoulders $g$ adapted to strike stops $g'$ on the uprights, whereby to limit the movements of said hopper or receptacle. In constructing the support for the hopper or receptacle F, brackets $g^3$ are secured to the uprights A of the frame and perforated for the reception of the pintles $g^4$ projecting from said hopper or receptacle F. A spring $h$ is coiled about one of the journals of the hopper or receptacle F, one end of said spring being adapted to bear against a projection on the hopper or receptacle and the other end bearing against one of a series of projections $g^2$ on one of the uprights A. By this spring the hopper or receptacle will be made to automatically assume its normal position when not filled with grain. By providing a series of projections $g^2$, the tension of the spring $h$ can be readily regulated. The ends and one side of the hopper or receptacle F are practically vertical, while the other side is sloping, its lower end terminating in such proximity to the other side of the hopper as to produce a contracted discharge opening $i$, while the upper end of the sloping side terminates at a point below the top of the box, the space between the upper edge of the sloping side and the top of the hopper being covered by a plate $i'$. Thus it will be seen that when the hopper or receptacle F is filled with grain one side thereof will be heavier than the other and consequently the hopper will tip or turn on its pivots, the purpose of which tipping or turning will be explained farther on. The grain which enters the hopper F will be discharged through the opening $i$ into a larger main receptacle G, the grain entering said main receptacle through an elongated opening $j$. The main receptacle G is pivoted eccentrically between the uprights A in proximity to their lower ends. In constructing the pivotal support of the main receptacle G, brackets $j'$ are secured to the uprights A of the frame and made to project therefrom in the opposite direction from the brackets $g^3$,—said brackets $j'$ being perforated for the reception of the pintles $j^2$ projecting from the receptacle G. The upper end of said main receptacle is preferably curved somewhat and provided with a plate G', which, when the main receptacle is in position to discharge its contents as hereinafter explained, will serve as a bottom for the upper receptacle or hopper F, but will be located a short distance below the same, and thus serve to cut off the supply of grain to the receptacle G. Brushes $k$ are secured to and depend from the upper receptacle or hopper G at each side of the opening $i$ and serve to brush the grain which may be resting on the plate G' during the discharge of the main receptacle, into said main receptacle when the latter assumes its normal position to receive another supply of grain. The main receptale G is provided interiorly, with an adjustable partition H, shown in detail in Fig. 4. This partition is provided with depending arms $l$, which are pivotally connected to the sides of the receptacle G by means of pins $j^3$ in proximity to its lower end and the partition will be limited in its movement by a stop or yoke $l^3$ secured to the receptacle G. Said partition can be moved from one adjustment to another manually by means of a suitable device to be inserted between the two receptacles. It will be observed that the depending arms $l$ of the partition H are pivoted at a point near the bottom of the receptacle G and below the pivots $j^2$ thereof. The vibration of the receptacle G will not be sufficient to cause the partition to automatically move from one adjustment to another, the frictional contact of said partition with the walls of the receptacle being amply sufficient to prevent this, and again, such automatic movement will be effectually prevented by the pressure of the grain against the partition. The partition H is also provided with an adjustable plate H', said plate being provided with elongated slots $l'$ for the reception of screws $l^2$ which also pass through the partition H. When the partition H is located adjacent to the dividing plate G', the grain will be directed toward the part of the receptacle G farthest removed from the pivotal support of said receptacle, thus adapting the receptacle to operate with light grain. When the partition H is thrown toward the other side of the receptacle G, the latter will be in condition to receive and measure heavy grain, the vacant space created by the partition overcoming the difference in the weight of heavy and light grain so that the surplus of weight in heavy grain will be thrown back on the pivotal support of the receptacle. By adjusting the size of the partition by means of the adjustable plate H', the amount of grain (in respect to its weight) to be discharged can be increased or reduced at will so that the proper measure of grain will enter the receptacle G before it is discharged therefrom. Thus it will be seen that when the plate H' is adjusted to its lowest position, and the partition is at the extremity of its throw farthest removed from the plate G', the amount of heavy grain permitted to flow behind said partition and in the part of the receptacle G farthest removed from the pivotal support of said receptacle, will be less than if said adjustable plate H' were at its highest position, and therefore when the grain being handled is moist and heavier than usual or a naturally heavy grain is being handled, the adjustable plate H' will be moved down to increase the size of the partition and cause only a sufficient quantity of grain to enter the receptacle.

The bottom of the main receptacle G is closed, but a lateral opening m is made in said receptacle at its lower end, said opening being normally closed while the receptacle is being filled, by means of a hinged gate m'. A yoke n is pivotally connected to the receptacle G and serves to normally retain the door or gate m' closed. The receptacle G is limited in its movement and retained in proper position to receive grain from the hopper F by means of stops o, projecting from said receptacle G and engaging the uprights A. The receptacle G is retained in its normal position to receive grain, and adapted to be returned to its normal position after the grain contained therein shall have been discharged, by means of a spring p, one end of which is attached to the receptacle G and the other end adapted to engage one of a series of pins p' projecting from one of the uprights A. In lieu of the spring p, a weight may, of course, be employed for the same purpose. It sometimes happens in the operation of grain meters, that the main receptacle closes and returns to its normal position to receive more grain before the complete contents of the receptacle have been discharged. To remedy this defect I provide a hinged or pivotally supported shield I which is carried by the spout D and adapted to project into the opening a, said shield being provided with an arm q adapted to be engaged by the bottom of the receptacle G and an arm q' projecting therefrom. When the receptacle G shall have discharged nearly all of its contents, it will begin to move back to its normal position to receive more grain, at which time the arm q' on the bottom of the receptacle will engage the arm q of the shield I and cause the shield to turn on its pivot and slightly contract the discharge opening a. The weight of a portion of the grain flowing from the receptacle G will now come upon the shield I and maintain the arm q of said shield in contact with the arm q', thus constituting a stop for the receptacle G and preventing it from returning to its normal position until its entire contents shall have been discharged.

Depending from the cross bar B', is a bracket r, which pivotally supports a hook or catch J, the outwardly projecting portion of which is weighted, said hook or catch being adapted to engage a small roller r' carried by a bracket r²,—which latter is adjustably secured to the upper end of the receptacle G. The inner end of the hook or catch J is provided with an arm or tongue s, and an upwardly projecting (preferably curved) arm s'. A tongue or plate t is hinged to a suitable bracket secured to the hopper or upper receptacle F and depends in proximity to the arms s, s', of the hook or catch J.

In operating the apparatus, grain will be permitted to flow into the upper hopper F, from which it will pass into the receptacle G and fill the latter. After the receptacle G shall have become filled, the continual flow of grain into the hopper F will cause the grain to collect in said hopper until the latter contains a sufficient weight of grain to cause it to tip or turn on its fulcrum. When the hopper F thus tips the tongue or plate t will engage the arm s of the hook or catch J and release the latter from the main receptacle G. As the receptacle or hopper F continues its movement, the upwardly projecting arm s' of the hook or catch J will strike the tongue or plate t and push it off the arm s, whereupon the hook or catch J will assume a position to receive the roller r' carried by the main receptacle G when the latter again returns to its normal position. The main receptacle G having been released, it will turn on its pivotal support and the yoke n will engage the spout D or a projection thereon and release the door or gate m, which will be forced open by the weight of itself and the grain, and the latter will be discharged through the opening a in the spout D into a bag or other receptacle supported as above explained under the spout.

The springs herein described for returning the hopper and receptacle to their normal positions may be dispensed with and one side of said hopper and receptacle made of heavier timber than the other. This will, however, tend to make the apparatus quite heavy and I therefore prefer to employ the springs.

Having fully described my invention, what I claim as new, and desire to secure by Letters Patent, is—

1. In a grain meter, the combination with a frame, a pivotally supported hopper, and a similarly supported receptacle located beneath the hopper, of latching device located in position to lock the receptacle and be automatically disengaged therefrom by the tilting of the hopper from its normal position due to the accumulation of the grain in the latter, substantially as set forth.

2. In a grain meter, the combination with a tilting hopper, a tilting receptacle located beneath the hopper in position to receive grain from the hopper, and a latch for locking the receptacle and adapted to be released therefrom by the hopper when the latter is tilted from its normal position, of a movable partition located within the receptacle and capable of being adjusted therein to regulate the grain capacity of the receptacle, substantially as set forth.

3. In a grain meter, the combination with a pivotally supported receptacle, of a movable partition located therein and adapted to compensate for the difference in the weight of different materials passing through the receptacle, an extension plate having elongated slots, and devices for fastening said extension plate to the partition, substantially as set forth.

4. In a grain meter, the combination with a pivotally supported hopper, adapted to be turned by the weight of material discharged therein, of a main receptacle eccentrically pivoted beneath said hopper and adapted to receive grain therefrom, of a dividing plate at the top of said receptacle adapted to constitute a temporary bottom for the hopper when said receptacle is discharging material, and means for returning said receptacle to its normal position when its contents shall have been discharged, substantially as set forth.

5. In a grain meter, the combination with a pivotally supported hopper adapted to be turned by the weight of material discharged therein, of a main receptacle eccentrically pivoted beneath said hopper and adapted to receive grain therefrom, of a dividing plate at the top of said receptacle adapted to constitute a temporary bottom to close said hopper while said receptacle is discharging material, brushes carried by said hopper and adapted to brush material from said dividing plate into the receptacle, and means for returning said receptacle to its normal position when its contents shall have been discharged, substantially as set forth.

6. In a grain meter, the combination with a hopper adapted to be turned by the weight of the material therein and a lower or main receptacle eccentrically pivoted below said hopper, of a pivoted weighted catch, a device carried by the lower or main receptacle with which said catch engages, arms projecting from said catch at right angles to each other, and a hinged tongue carried by said hopper and adapted to engage one of said arms of the catch when said hopper is tilted to release the catch from the lower or main receptacle, the other arm of said catch being adapted to shove the tongue from engagement with the first-mentioned arm before the main receptacle returns to its normal position, substantially as set forth.

7. In a grain meter, the combination with a hopper adapted to be turned by the weight of the material discharged therein and a lower or main receptacle eccentrically pivoted below the hopper, of a pivoted weighted catch, a bracket carried by the lower or main receptacle, a roller carried by said bracket and adapted to be engaged by said catch, arms projecting from said catch at right angles to each other, and a hinged tongue carried by said hopper and adapted to engage one of said arms and be engaged by the other to release it from the first mentioned arm before the main or lower receptacle returns to its normal position, substantially as set forth.

8. In a grain meter, the combination with a frame, of a hopper eccentrically pivoted therein, an adjustable spring for returning said hopper to its normal position, a main receptacle eccentrically pivoted beneath said hopper and an adjustable spring for returning said main receptacle to its normal position after its contents shall have been discharged, and means for automatically locking and releasing said main receptacle, substantially as set forth.

9. In a grain meter, the combination with a pivotally supported receptacle having a lateral opening at its bottom, and a hinged gate adapted to normally close said opening, of a yoke pivotally secured at its ends to the sides of the receptacle and passing in front of and resting against the gate and adapted to retain said gate normally closed and release it when said yoke engages a part of the apparatus independent of the pivoted receptacle, substantially as set forth.

10. In a grain meter, the combination with a frame, of a receptacle pivotally supported therein and provided with a projection on the bottom thereof, a spout at the lower end of said frame under the pivoted receptacle and a shield pivotally connected to said spout and provided with an extension adapted to be engaged by the projection on the receptacle as the latter moves, substantially as and for the purpose set forth.

11. In a grain meter, the combination with a pivotally supported receptacle, a frame for supporting the same and a spout at the lower end of the frame, of a shield pivotally supported by said spout, an arm projecting from the shield, and an arm projecting from the receptacle and adapted to strike the arm of the shield and cause the latter to partially close the opening in the spout when the receptacle begins to turn to its normal position, substantially as set forth.

12. In a grain meter, the combination with a main or measuring receptacle adapted to have an oscillatory movement, of a pivoted upper receptacle adapted to be tipped by the weight of the grain therein, means for returning said upper receptacle, a latch bar adapted to engage the main receptacle, and means carried by the upper receptacle for disengaging said latch bar from the main receptacle, said latch bar provided with a device whereby it is released from said disengaging means so that it may again engage the main receptacle before the upper receptacle returns to its normal position, substantially as set forth.

13. In a grain meter, the combination with a main pivotally supported receptacle, of an upper pivoted hopper, a latch bar adapted to be actuated by the hopper, and a roller located at the upper end of the receptacle and adapted to insure the easy operation of said bar in locking the receptacle, substantially as set forth.

14. In a grain meter, the combination with a lower pivoted receptacle and an upper pivoted receptacle adapted to be tipped by the weight of grain therein, of a stop adapted to limit the movement of said upper receptacle, an adjustable spring for returning said upper receptacle, and latch mechanism for releasing the lower receptacle when the upper receptacle is operated, substantially as set forth.

15. In a grain meter, the combination with a main receptacle, of a pivotally supported hopper located in position to discharge its contents into the receptacle, said hopper eccentrically pivoted so that it is tilted by the weight of the grain backed up therein from the main receptacle to effect a release of the main receptacle and a closure thereby of the hopper, substantially as set forth.

16. In a grain meter, the combination of a main receptacle and a hopper located above and discharging into the receptacle, both the receptacle and hopper eccentrically pivoted, whereby the flow of grain from the hopper to the receptacle is cut off by the grain backing up into the hopper sufficiently to cause the hopper to tip and the receptacle to be released and allowed to tip, substantially as set forth.

17. In a grain meter, the combination with a pivoted hopper, and a pivoted main receptacle, of a latch for locking one of said parts, said latch constructed to be operated to release the receptacle by a tilting motion of the hopper, substantially as set forth.

18. In a grain meter, the combination with a main receptacle of a hopper pivoted above the receptacle in position to receive grain and discharge it into the receptacle, means for holding the receptacle in its upright position, and connections between the hopper and said holding means for releasing the receptacle when the hopper is made to tilt, substantially as set forth.

In testimony whereof I have signed this specification in the presence of two subscribing witnesses.

FREDERICK FRANK KANNE.

Witnesses:
   A. J. KANNE,
   LEON EVERETT.